Sept. 12, 1933.                R. O. HAMILL                1,926,851
                         MAXIMUM DEMAND METER
                      Filed Aug. 5, 1931          3 Sheets-Sheet 1

R. O. Hamill  INVENTOR

BY his ATTORNEY
Thomas Howe

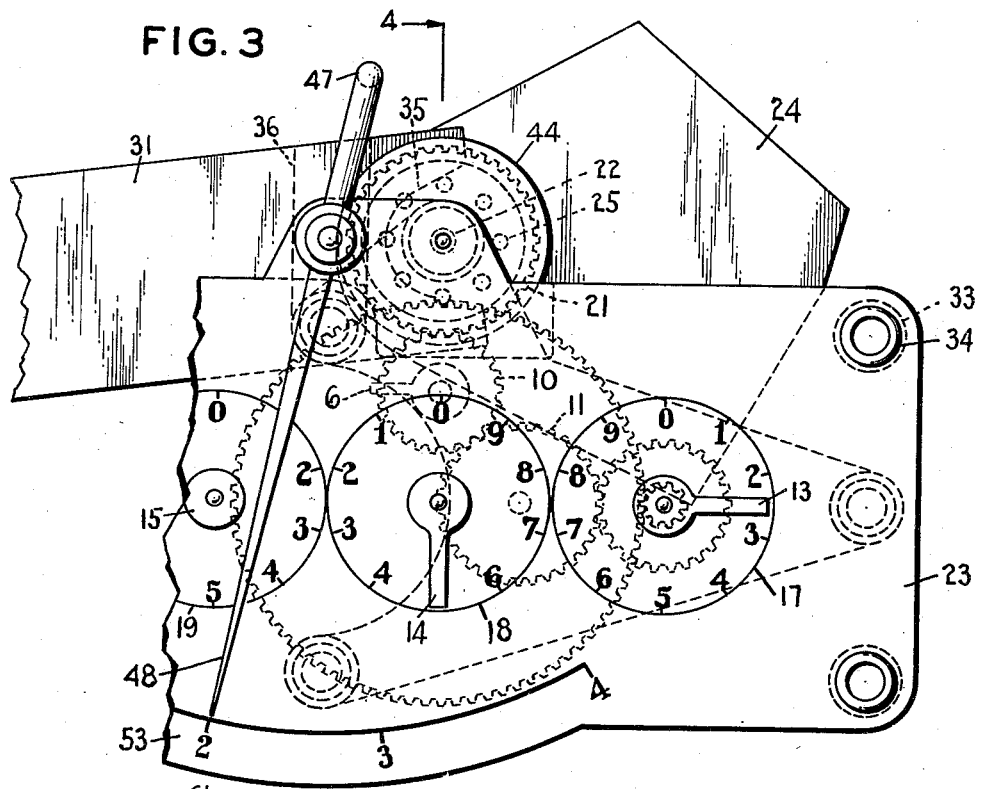

Sept. 12, 1933.    R. O. HAMILL    1,926,851
MAXIMUM DEMAND METER
Filed Aug. 5, 1931    3 Sheets-Sheet 3

Patented Sept. 12, 1933

1,926,851

UNITED STATES PATENT OFFICE 1,926,851

MAXIMUM DEMAND METER

Ret O. Hamill, Brooklyn, N. Y., assignor, by direct and mesne assignments, to Retlau Electric Appliance Corporation, New York, N. Y., a corporation of New York Application August 5, 1931. Serial No. 555,241

8 Claims. (Cl. 171—34)

This invention relates to electric meters which shall indicate the maximum consumption of electric energy during a given time.

Integrating watt meters for indicating the total watts of electric energy which have passed through the meter, are well known. Such indication, however, takes no account of how the use of the current was distributed throughout the time. There may have been a very large amount of energy used during some intervals of time and a comparatively small amount used during other intervals of time. The ordinary integrating watt meter, however, takes no account of this but adds up the wattage used and indicates the sum thereof.

It has been found, however, that it is desirable to know the maximum demand for power made as it may have an important bearing upon the rate of charge for the power and be of importance in other particulars.

It is the main object of the present invention to provide an improved means for indicating the maximum energy demand.

Other and ancillary objects of the invention will appear hereinafter.

In the accompanying drawings which illustrate the invention—

Fig. 3 is a front elevation, partly broken away, on an enlarged scale, of the apparatus of Figs. 1 and 2;

Fig. 5 is an elevation of the time controlled contact mechanism which also shows in diagram the manner of controlling several meters from a single time mechanism.

Figure 2:
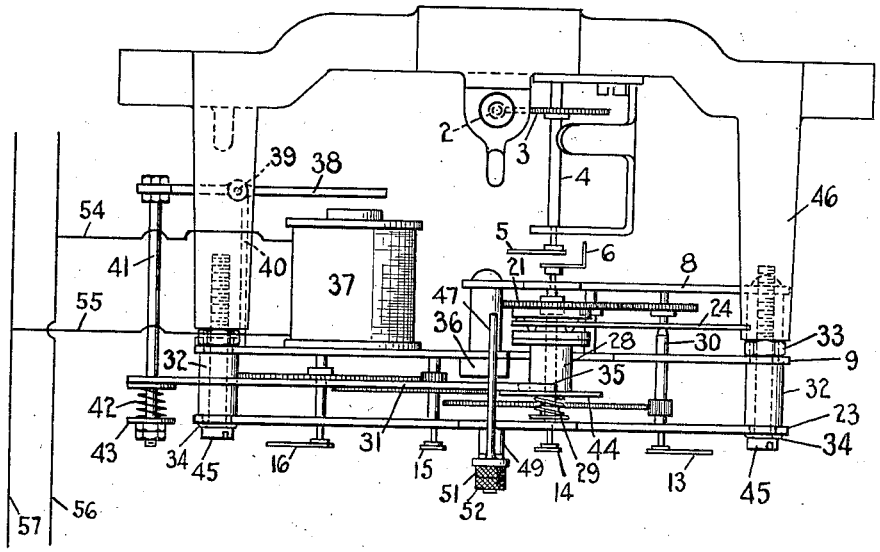
Fig. 2 is a top plan view of the apparatus of Fig. 1.

Referring to the drawings 1 is a vertical shaft of the well known motor operated type of integrating watt meter which rotates at a rate according to the quantity of electricity (watthours) to be measured. The mechanism for driving and controlling such shaft being well known, it is unnecessary to illustrate it.

Fixed to and rotating with the shaft 1 is the worm 2 which is in driving relation to the worm gear 3 fixed upon the shaft 4. Fixed to the shaft 4 is a radially extending arm 5 in the path of which, as it rotates, is a projection 6 fixed upon the shaft 7 rotatably mounted in the plates 8 and 9.

Fixed upon the shaft 7 is a gear 10 meshing with the gear 11 fixed upon the rotatable shaft 12 which is connected by a suitable train of gearing with the pointers 13, 14, 15 and 16 rotating respectively over the dials 17, 18, 19 and 20 to indicate the watts consumed in a manner well known in connection with integrating watt meters, so that this apparatus need not be further referred to.

To provide the maximum demand indication there is added to the usual integrating watt meter construction apparatus described as follows:

In mesh with the gear 10 is a gear 21 fixed on the shaft 22 journaled in the plates 8 and 23. Mounted to rotate on the shaft 22 and also to slide longitudinally thereon, is a sheet metal sector or plate 24 having the punched up projections 25. The part 24 is mounted between a felt washer 26 fixed to the gear 21, and a felt washer 27 fixed to the sleeve 28 slidably mounted on the shaft 22. A spring 29 tends to force the sleeve 28 and its carried felt washer 27 toward the felt washer 26, the pressure of the spring serving to grip the part 24 between the washers so that the part 24 will turn with the shaft 22, the members 21 and 28 forming a clutch for detachably securing the part 24 to the shaft 22.

It will be observed that the center of gravity of the piece 24 is at one side of the shaft 22 so that when the part 24 is released from the clutch members 26 and 27 the part 24 will drop by gravity until stopped by coming against the shaft 30.

In order to release the clutch members 26 and 27 and allow the part 24 to fall freely, a lever arm 31 is provided which is mounted to both slide and rotate on the sleeve 32. This sleeve is one of four located at each of the corners of the plates 9 and 23 and serving to space those plates apart, nuts 33 screwed on to one end of the sleeve, the other end 34 of the sleeve being peened over, serving to secure the plates together. The plate-like lever 31 has a bifurcated end 35 which embraces the sleeve 28 and is adapted to fulcrum upon the fibre piece 36 when the end of the lever 31 is pulled upwardly as viewed in Fig. 2, upon the energization of the electromagnet 37 mounted upon the plate 9. The armature 38 of the electromagnet is pivoted at 39 in a bracket 40 mounted upon the plate 9. A bolt 41 passes through a hole in the armature 38 and also a hole in the lever plate 31. A spring 42 is interposed between the washer 43 on the end of the bolt 41 and plate 31 to afford a flexible connection to permit any inequalities of movement of the clutch member and magnet armature to be compensated for. Upon energization of the magnet 37 this armature will be attracted, the bolt 41 will be pulled upwardly as viewed in Fig. 2, the spring 42 will be compressed against the outer end of the lever 35, the inner bifurcated end of the lever 21 will be moved against the flange 44 and force it along the shaft 22 against the spring 29 thereby separating the clutch members 26 and 27, leaving the part or sector 24 free to fall.

Figure 1:
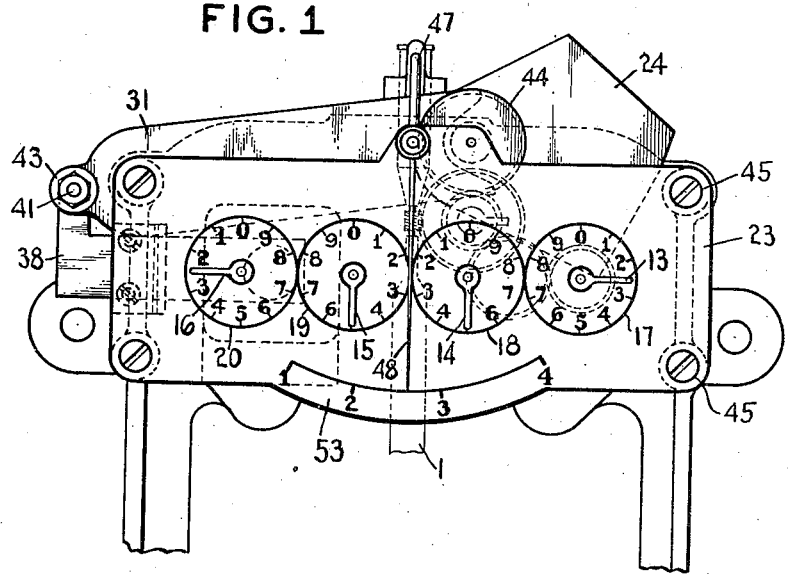
Fig. 1 is a front elevation of apparatus embodying the invention.
Figure 4:
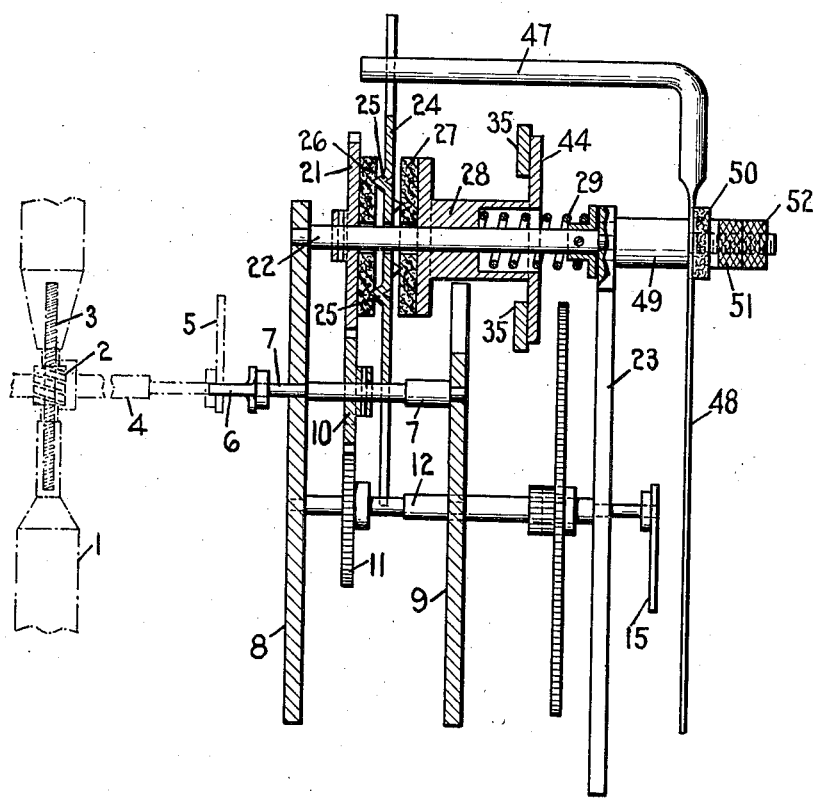
Fig. 4 is an end elevation of the apparatus of Fig. 3 viewed from the left of that figure, partly broken away to show a section on the line 4—4 of Fig. 3.

As the sector 24 travels upwardly (Figs. 1 and 3) being clutched to the shaft 22, if it moves far enough before being unclutched, it comes against the horizontal arm 47 of the index 48 which is pivoted on the post 49 secured to the plate 23. The index 48 is secured upon the post by means of a felt washer 50 which is pressed against the index 48 by means of a nut 51 locked in position by a nut 52. The felt washer is pressed against the index sufficiently hard to hold the index in whatever position of rotation it may be placed, but to readily permit it to be moved by pressure of the sector 24 against it. Secured upon the plate 23 and adjacent to the end of the index 48 is a dial 53 calibrated to read in kilowatt hours.

It will be seen that the unit comprising the plates 9 and 23 and their carried parts, is secured in position upon the meter by means of screws 45 passing through the sleeves 32 at each corner of the plates 9 and 23 and screwed into the projections 46 which are integrally secured to the frame of the meter. It will further be seen that this unit may readily be removed by removing screws 45. This construction facilitates the attachment of the mechanism embodying the present invention to an ordinary meter, it being simply necessary to remove the screws similar to 45, which secure the unit including the gear train, dials and indexes of the ordinary integrating watt meter. Such unit may then be removed and the unit containing the present invention may be substituted for it, being secured in position by inserting the screws 45.

The magnet 37 is connected by means of conductors 54 and 55 with the lines 56 and 57, circuit being made through the magnet 37 and a source of current supply such as the battery 58 (see Fig. 5) by contacts 59 and 60, when these contacts are in engagement, circuit being broken when they are disengaged. The contact 59 which is connected with the conductor 56 is mounted upon the pivoted member 61 which is held stationary by any desired means of adjustment such as adjusting screws 62 and 63. The contact 60 is secured to a shaft 64, upon which shaft is also fixed the gear 65 adapted to mesh with the segmental gears 66 and 67 fixed to the shaft 68 which is the minute shaft of a clock mechanism contained in the casing 69. It will now be apparent that the segments 66 and 67 will alternately engage with the gear 65 once every half hour, and will operate to turn the contact 60 into engagement with the contact 59. The duration of the engagement may be adjusted by adjusting the position of the contact 59 by means of screws 62 and 63. Such duration need be but very short—only sufficient to cause the magnet 37 to be energized for a sufficient length of time to release the clutch so that the sector 24 may drop to its initial position.

The time operated contact mechanism may be used for the common time control of a plurality of meters, as shown in Fig. 5, the four meters 70, 71, 72 and 73 being shown as having their magnets 37 connected with the conductors 56 and 57.

It will now be seen, that at the beginning of each half hour the sector 24 will occupy its initial position and, the magnet being deenergized, the sector will be clutched to the shaft 22 and will move upwardly (Figs. 1 and 3) during the ensuing half hour at which time the magnet 37 will again be energized and permit the sector to drop to its initial position. The travel upwardly of the sector during the half hour will be a measure of the kilowatt hours consumed during that period. If in such upward travel the edge of the sector 24 comes against the arm 47 of the index 48, the index will be moved with the sector to the end of its travel and will be left in that position when the sector returns to its initial position. The index will then indicate on the dial 53 the kilowatt hours consumed during the half hour of upward travel of the sector. The sector having been returned to its initial position will again be gripped to its shaft and travel upwardly during the next half hour. If this travel shall not be as great as the travel of any preceding half hour, then the sector will not come against the arm 47, but it is returned to its initial position and the index will not be moved. If, however, the travel of the sector should be greater than for any preceding half hour the sector would come against the arm 47 and move it to the end of the upward travel of the sector. The position of the index 48 therefore, which is denoted by the scale or dial 53, shows the maximum kilowatt hours of electricity consumed during any of the half hour periods over a given elapsed time. In practice the index would be set at zero at the beginning of a given time say once a day, once a week or once a month, and the index 48 will point out upon the scale 53 the maximum kilowatt hours consumed during any half hour period between successive times of resetting of the index to zero.

While the invention has been illustrated in what is considered its best application it may have other embodiments without departing from its spirit and is not, therefore, limited to the structure shown in the drawings.

What I claim is:

1. The combination with a shaft of an integrating electric watt meter, of a second shaft geared thereto, a sector pivoted upon and free to slide along said second shaft and tending to be moved by gravity to an initial position, a clutch for gripping said sector to said second shaft, said clutch having faces of resilient material and a spring tending to force said clutch into gripping position, a lever adapted to release said clutch against said spring, an electromagnet operating said lever, a circuit for said electromagnet including contacts and an electrical source, time mechanism for controlling said contacts and an index projecting into the path of said sector and adapted to be engaged by said sector should it travel sufficiently far, said index remaining in any position to which it may be moved.

2. The combination with a shaft driven in response to a quantity to be measured, a member pivoted upon and free to slide along said shaft and biased to an initial position, a clutch adapted to grip said member to said shaft, said clutch having resilient facing material for engaging said biased member, means for operating said clutch to grip the said biased member to said shaft and release it therefrom and an index projecting into the path of said biased member.

3. The combination with a shaft driven in response to a quantity to be measured, of a member pivotally mounted on said shaft and also capable of longitudinal movement thereon, said member having its center of gravity lying outside said shaft whereby it tends to drop into an initial position, clutch members upon said shaft adapted to be moved toward and away from each other to grip the aforesaid member to and release it from said shaft, means for moving said clutch members toward and away from each other and an index operated by the first mentioned member.

4. The combination with a shaft driven in response to a quantity to be measured, a member pivoted upon and free to slide along said shaft and tending to be moved by gravity to an initial position, a clutch for detachably gripping said member to said shaft, a spring and lever adapted to operate said clutch in opposite directions, timed means for operating said lever and an index projecting into the path of said member and adapted to be engaged thereby should it travel sufficiently far, said index remaining in any position to which it may be moved.

5. The combination with a shaft driven in response to a quantity to be measured, a sector pivoted upon and free to slide along said shaft and tending to be moved by gravity to an initial position, a clutch for detachably gripping said sector to said shaft, a spring and lever for operating said clutch in opposite directions to grip said sector to and release it from said shaft, an electro-magnet operating said lever, a circuit for said electro-magnet including controlling contacts and an electrical source, and an index projecting into the path of said sector and adapted to be engaged by said sector should it travel sufficiently far, said index remaining in any position to which it may be moved.

6. The combination with a shaft driven in response to a quantity to be measured, a sector pivoted upon and free to slide along said shaft and tending to be moved by gravity to an initial position, a clutch for detachably gripping said sector to said shaft, a spring and lever for operating said clutch in opposite directions to grip said sector to and release it from said shaft, an electro-magnet operating said lever, a circuit for said electro-magnet including controlling contacts and an electrical source, and an index projecting into the path of said sector and adapted to be engaged by said sector should it travel sufficiently far, said index remaining in any position to which it may be moved and timed mechanism for controlling said contacts.

7. The combination with a shaft of an integrating electric watt meter, of a second shaft geared thereto and a member loosely pivoted about said shaft so as to be movable with relation thereto, said member having its centre of gravity at one side of said shaft whereby it tends to gravitate downwardly in the opposite direction from movement of said shaft, and time controlled means for securing said member to said second shaft, said member when secured to said shaft being moved thereby in opposition to its gravitational tendency, and an index remaining in any position in which it may be placed and adapted to be moved by said member when said member is driven by said second shaft.

8. The combination with a shaft of an integrating electric watt meter, of a pivoted member having its center of gravity at one side of its pivotal point whereby it tends to gravitate to an initial position, time controlled means for operatively connecting said member with said shaft to drive said member in opposition to its gravitational tendency, and an index adapted to remain in any position in which it may be placed and adapted to be engaged by said member when it is driven by said shaft.

RET O. HAMILL.